April 9, 1940.  C. S. ASH  2,196,718
WHEEL
Filed Feb. 7, 1938   2 Sheets-Sheet 1
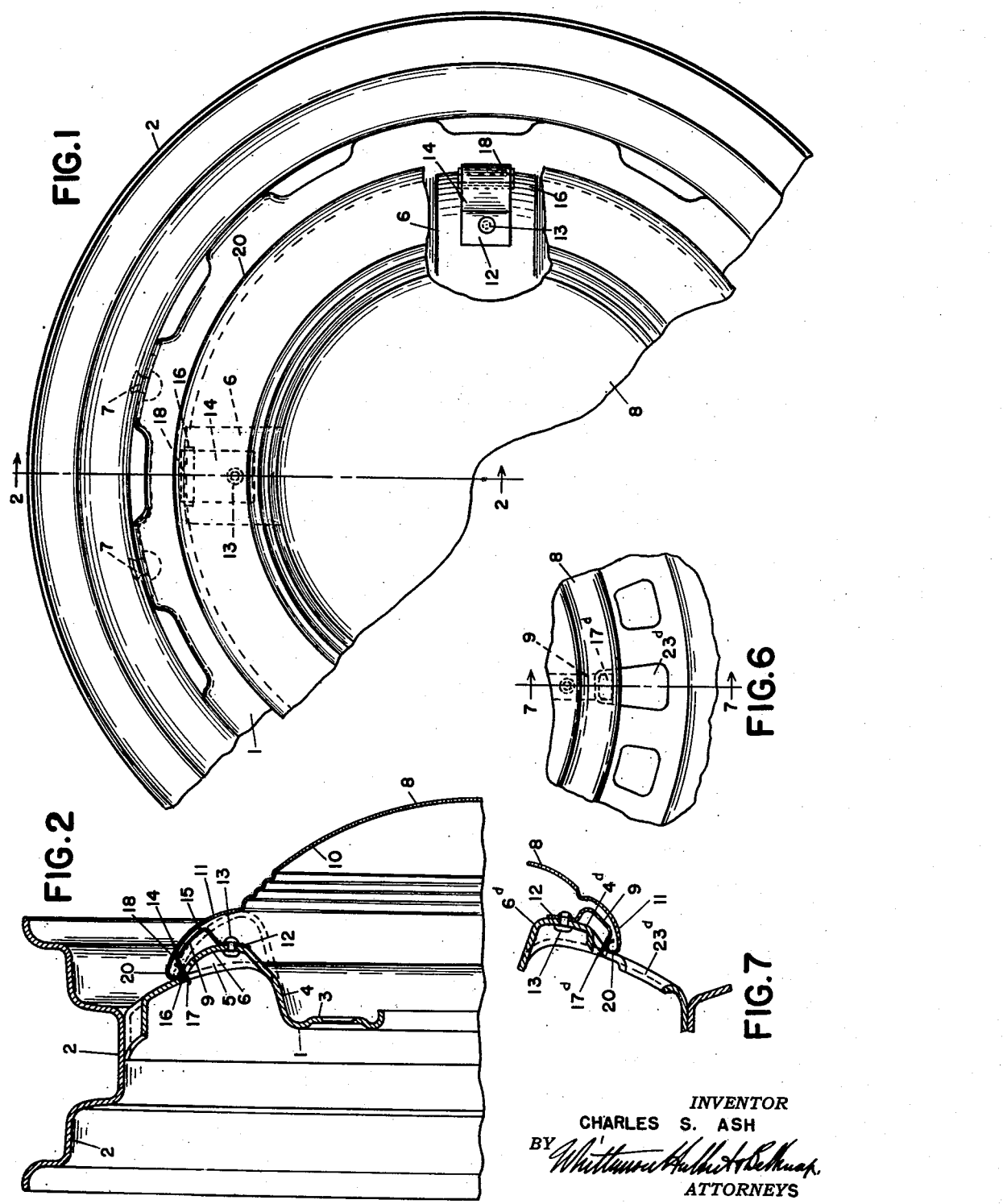
INVENTOR
CHARLES S. ASH
BY
ATTORNEYS April 9, 1940.  C. S. ASH  2,196,718
WHEEL
Filed Feb. 7, 1938  2 Sheets-Sheet 2

INVENTOR
CHARLES S. ASH
BY
ATTORNEYS

Patented Apr. 9, 1940

2,196,718

UNITED STATES PATENT OFFICE 2,196,718

WHEEL

Charles S. Ash, Milford, Mich., assignor to Kelsey-Hayes Wheel Company, Detroit, Mich., a corporation of Delaware Application February 7, 1938, Serial No. 189,205

2 Claims. (Cl. 301—37)

This invention relates to vehicle wheels and refers more particularly to a wheel structure using the large diameter type cover plate or hub cap.

The principal object of the invention is to reduce the weight and the cost of manufacture of vehicle wheels without sacrificing either the strength or appearance of that wheel.

A further object which contributes materially to reducing the cost of manufacture of the vehicle wheel resides in the provision of a metal wheel assembly having the appearance of a wheel in common use in which the wheel body is capable of being fashioned with less drawing, and in which the cover plate is fashioned to provide the desired bowed or convex appearance.

A still further object of this invention is to provide means upon the wheel body, for positively centering the cover plate, which means may be readily formed without increased material being required.

With these and other objects in view, the invention resides in the novel features of construction, combination, and arrangement of parts as is more fully hereinafter set forth.

In the drawings:

Figure 1 is a front elevational view of half of a wheel structure, with parts broken away, disclosing a vehicle wheel embodying my invention.

Figure 2 is a cross sectional view taken on line 2—2 of Figure 1.

Figure 6 is a fragmentary front elevational view of a wheel body portion showing a modification of the peripheral spaced opening type of wheel, and Figure 7 is a fragmentary cross sectional view taken on line 7—7 of Figure 6.

Figure 4:
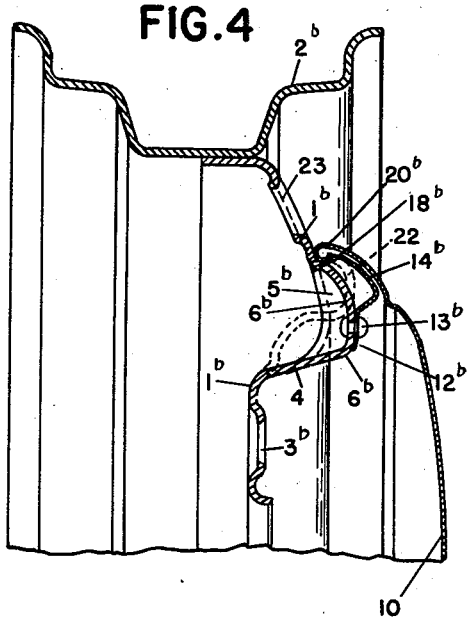
Figure 4 is a fragmentary view similar to Figure 3 showing an additional modification.

As illustrated in the present instance, the vehicle wheel comprises the wheel body 1 which is of the demountable bolted on type, and the rim member 2 which is a tire carrying rim, preferably of the drop center type. The wheel body has a bolting on portion 3, generally axial portion 4, a radially outwardly extending portion 5, and bosses 6. The radially outwardly extending portion 5 is formed with a peripheral flange to which the rim member is secured by suitable means, such as rivets 7. Cover plate 8 is adapted to fit on this wheel and is secured in place by spring clips 9.

As can be seen in Fig. 2, the dotted line discloses a common type of wheel (hereinafter referred to as the "old" wheel) having an annular extremely bowed portion extending in an axially outwardly direction. In order to make this portion, special deep drawing operations are necessary. It will be seen that sectional portion 5 of the applicant's structure is bowed only a fraction of the amount of this old design. The result is a substantial saving in both material and operation. On this old type wheel, the cover plate terminated in the zone of the axially outermost portion of the dotted line.

The appearance of a highly bowed wheel is maintained in the present construction, however, by the shape of the cover plate 8. It has a substantially bowed axially outboard portion 10, and an annular lip portion 11 which is substantially concavo-convex and which has bead 20 at its free edge. This lip 11, it will be noted, has substantially the same cross sectional contour as the annular extremely bowed portion of the old wheel. Thus, the light gauge cover plate material is used instead of the heavy gauge wheel material to get the same appearance at a decided saving in weight of the wheel.

For centering the cover plate, bosses 6 are provided on the wheel. They extend out generally axially at spaced points about the wheel from portion 5 in a manner to positively center the plate 8, and three or four bosses are sufficient.

Spring clips such as 9 are provided for securing the cover plate. In the present construction, the clips are shown as having their radially inner ends 12 fastened by suitable means, such as rivets 13, to the outboard side of the bosses 6. The body portions 14 of the clips are substantially U-shaped and have base portions 15 extending beyond the outboard side of the bosses. The radially outermost portions of the bosses are provided with openings 16 through which the radial outermost ends 17 of the clips extend. The annular bead of the cover plate snaps over portions 18 of the clips and is yieldably held by these portions at the radially outermost side of the bosses. Thus, it can be seen that when the cover plate is snapped into engagement on the wheel, the radially outermost portion of the bosses cooperates with the peripheral bead on the cover plate to assure a positive centering of that plate with relation to the wheel.

Figure 3:
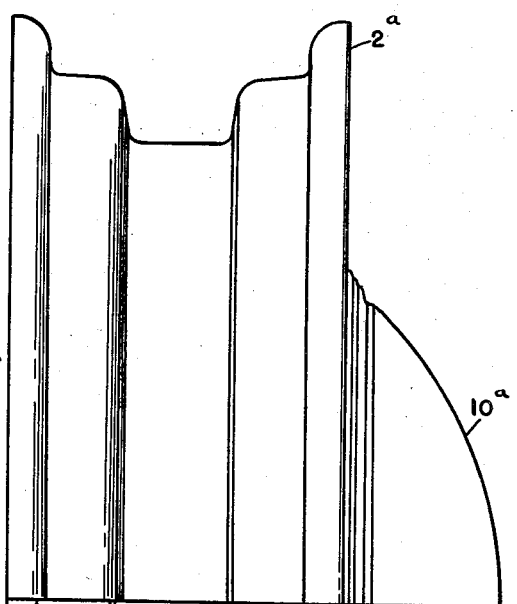
Figure 3 is a fragmentary cross sectional view similar to Figure 2 showing a modification.

With reference to Fig. 3, the modification therein shown differs from that shown in Figs.

1 and 2 in that the bolting on flange 3ª and the generally axially extending portions 4ª are reenforced by ribs 21 which are in substantial alignment with bosses 6ª. In other respects, this modified structure is the same as that disclosed in Figs. 1 and 2.

With reference to Fig. 4, a second modification is shown. In this figure, as in Fig. 2, the dotted line shows the contour of an old type of body portion and especially the axially outwardly channel portion 22, which is eliminated in the new structure. In this modification, the bosses 6ᵇ are spaced radially inwardly a greater distance to allow for the peripheral spaced openings 23 on the wheel body portion 1ᵇ.

Figure 5:
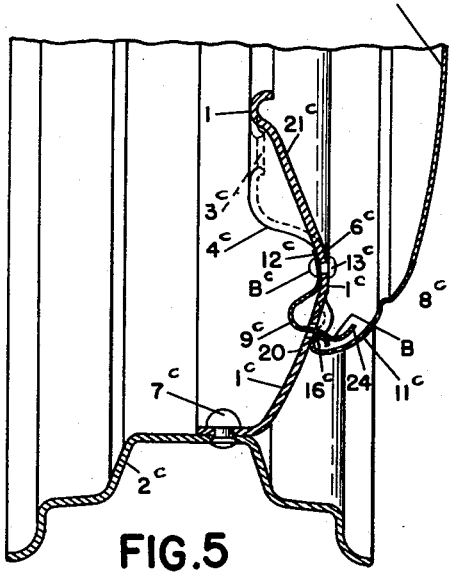
Figure 5 is also a fragmentary view similar to Figures 3 and 4 showing a further modification.

Fig. 5 is similar to the modification shown in Fig. 3 in that the bolting on flange 3ᶜ and the generally axially extending portion 4ᶜ are reenforced by ribs 21ᶜ. In this construction the spring clips 9ᶜ are shown as having their radially innermost ends fastened by suitable means such as rivets 13ᶜ to the inboard side of the body portion 1ᶜ.

The body portion of the clip is substantially U-shaped and extends axially inwardly from the body portion 1ᶜ but has its free end 24 extending on the outboard side of the body portion 1ᶜ through opening 16ᶜ to frictionally engage cover plate 8ᶜ. It will also be noticed in this modification that the bosses 6ᶜ are much less pronounced than those bosses shown and described in previous modifications.

Figures 6 and 7 are fragmentary views of a portion of a wheel body having peripheral spaced openings. In this modification, the openings 23ᵈ registering with the bosses 6ᵈ are extended radially inwardly to allow free ends 17ᵈ of the spring clips to extend therethrough. The advantages of this modification is an additional saving in weight plus the fact that the making of extra spring openings such as 16 is eliminated.

What I claim as my invention is:

1. In a vehicle wheel, a wheel body, a cover plate adapted to cover a substantial portion of said wheel body, means including an outwardly struck boss on said wheel body for centering said cover plate and means for securing said cover plate to said wheel body comprising resilient securing means on the boss for frictionally engaging said plate.

2. In a vehicle wheel, the combination of a relatively axially shallow wheel body, a relatively axially deep cover plate adapted to cover a substantial portion of said body, said body being provided with bosses to center said cover plate, resilient clip means extending from said bosses to removably engage said cover plate, said cover plate extending over said bosses and said clip means to conceal the same and cooperating with said body to present the appearance of a convex axially relatively deep wheel.

CHARLES S. ASH.